United States Patent

Homa et al.

[15] 3,684,877
[45] Aug. 15, 1972

[54] CONTROL SYSTEM FOR TIRE BUILDING

[72] Inventors: George D. Homa, Northfield; Ronald J. Kindy, North Canton; Earl D. Miller, Tallmadge, all of Ohio

[73] Assignee: Akron Standard, division of Eagle-Picher Industries Inc., Cincinnati, Ohio

[22] Filed: Aug. 19, 1970

[21] Appl. No.: 65,208

[52] U.S. Cl. ............235/154, 318/569, 235/151.11, 156/401
[51] Int. Cl. .............................................G06f 15/46
[58] Field of Search .156/132, 401; 235/151.11, 154; 318/567, 569, 570, 571, 579

[56] References Cited
UNITED STATES PATENTS

| | | | |
|---|---|---|---|
| 3,244,575 | 4/1966 | Sabo et al. | 156/132 |
| 3,568,072 | 3/1971 | Rosener | 318/571 |
| 3,530,283 | 9/1970 | McDaniel | 318/571 |
| 3,414,787 | 12/1968 | Reuteler et al. | 318/570 |
| 3,356,994 | 12/1967 | Elbling | 318/569 |

Primary Examiner—Thomas A. Robinson
Attorney—Mack D. Cook

[57] ABSTRACT

A control system for tire building wherein a first ply of fabric is wrapped around a rotating drum and thereafter additional "work" is done in relation to the first and subsequently wrapped plies and other tire components. The rotational speed of the drum controls the movement of other mechanical devices which perform the additional "work."

6 Claims, 4 Drawing Figures

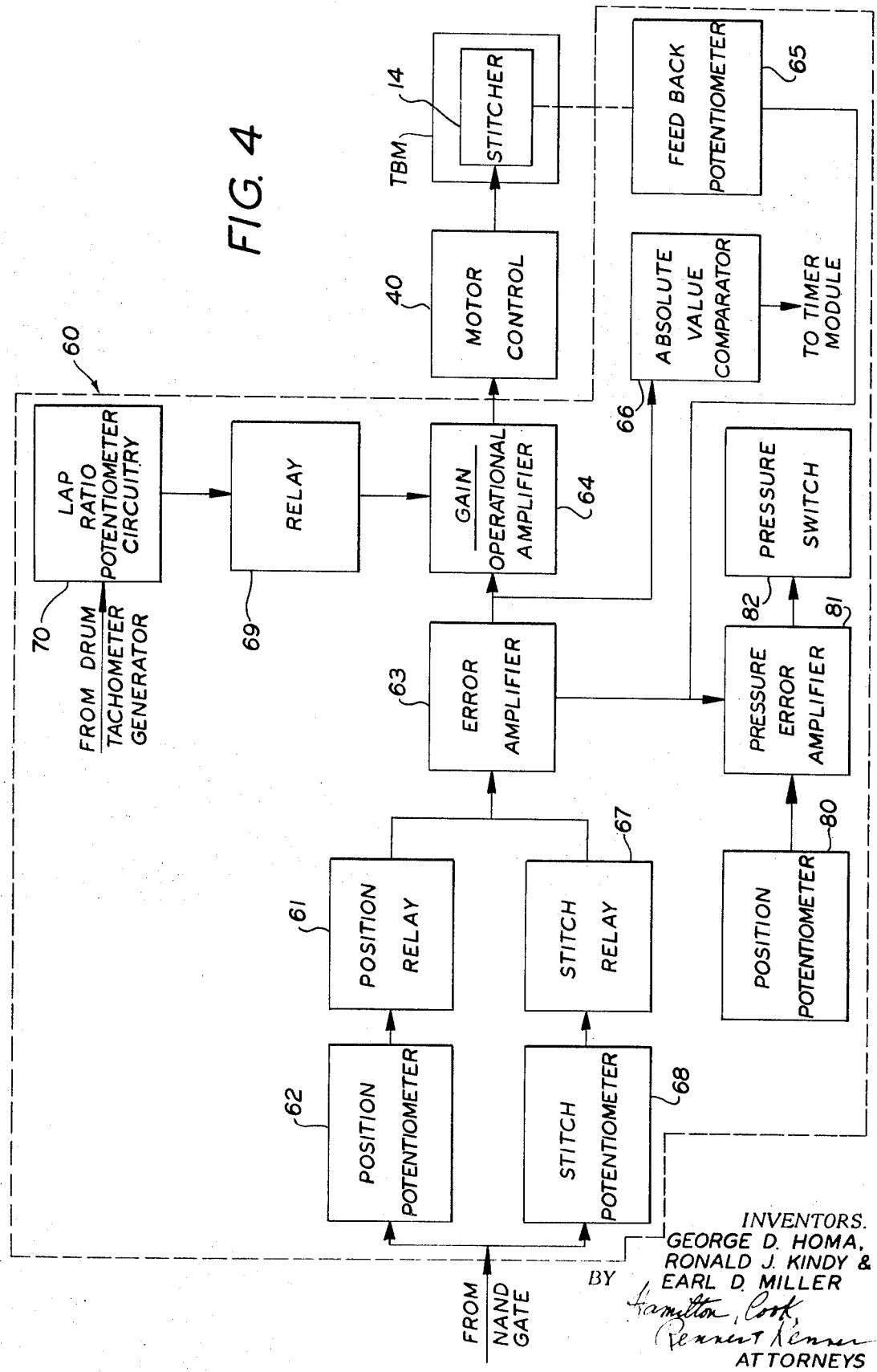

CONTROL SYSTEM FOR TIRE BUILDING

BACKGROUND OF THE INVENTION

The present invention relates to the efficient and precise building of an unvulcanized tire on a rotating drum. Building of a tire on a rotating drum requires sequential performances of numerous "work" functions beginning with and subsequent to wrapping a first ply of "tire fabric" around the drum. Techniques for building a tire using a rotating drum are well known in the prior art. See a 1951 patent to L. C. Frazier, U. S. Pat. No. 2,567,064, which describes techniques for building a tire on a rotating drum of the radial expanding type with pneumatic bladder turn up for wrapping the bead wire components of the tire.

The building of a tire involves both dimensional and dynamic factors. The various components of a tire, inner liner, body plies, beads, chafer strips, breaker plies, tread stock, etc., must each be placed around the building drum in a precise and exact laminate relation. At each stage of component placement, pressure forces are applied to adhere the components to each other so that a dimensionally precise structure may be removed from the building drum and transported to the vulcanization press.

Heretofore, various "work" functions in building a tire on a rotating drum have been "mechanized" or "-semi-automated." Control systems do exist wherein the operator may initiate one or more of the devices associated with the building drum merely by pushing a button. These prior systems, while tending to increase productivity have nevertheless not been responsive to the dimensional and dynamic factors involved in tire building.

SUMMARY OF THE INVENTION

The object of the invention is to provide a control system for the efficient and precise building of an unvulcanized tire on a rotating drum. More particularly, the object is to provide a control system for the performance of numerous "work" functions beginning with and subsequent to wrapping a first ply of "tire fabric" around the drum. Specifically, it is an object to provide a control system wherein the rotational speed of the drum controls the movement of devices which perform the "work" functions so as to observe, recognize and correlate the dimensional and dynamic factors involved in the proper building of a tire on a rotating drum.

These and other objects of the invention, as well as the advantages thereof, will be apparent in view of the description of a preferred embodiment for control of the "stitching" operation in the tire building sequence, as set forth in detail below.

In general, a control system according to the invention is used with a tire building machine wherein a first ply of fabric is wrapped around a rotating drum and thereafter work devices associated with the drum sequentially perform operations upon the first ply and other tire components, comprising, input program means providing coded commands relating to a specific operation in the tire building sequence, matrix decoder means receiving and recognizing said coded commands and providing outputs to activate circuitry to accomplish an operation in the tire building sequence, timer means controlling an output of said matrix decoder means so that said output is provided only at select times, drum control means capable of receiving an output of said matrix decoder means and operating the tire building drum accordingly, and work device control means capable of receiving an output of said matrix decoder means and operating the work device accordingly.

DESCRIPTION OF THE DRAWINGS

FIG. 4 is a block diagram of the stitcher module and control circuitry shown in FIG. 1.

DESCRIPTION OF A PREFERRED EMBODIMENT

Figure 1:
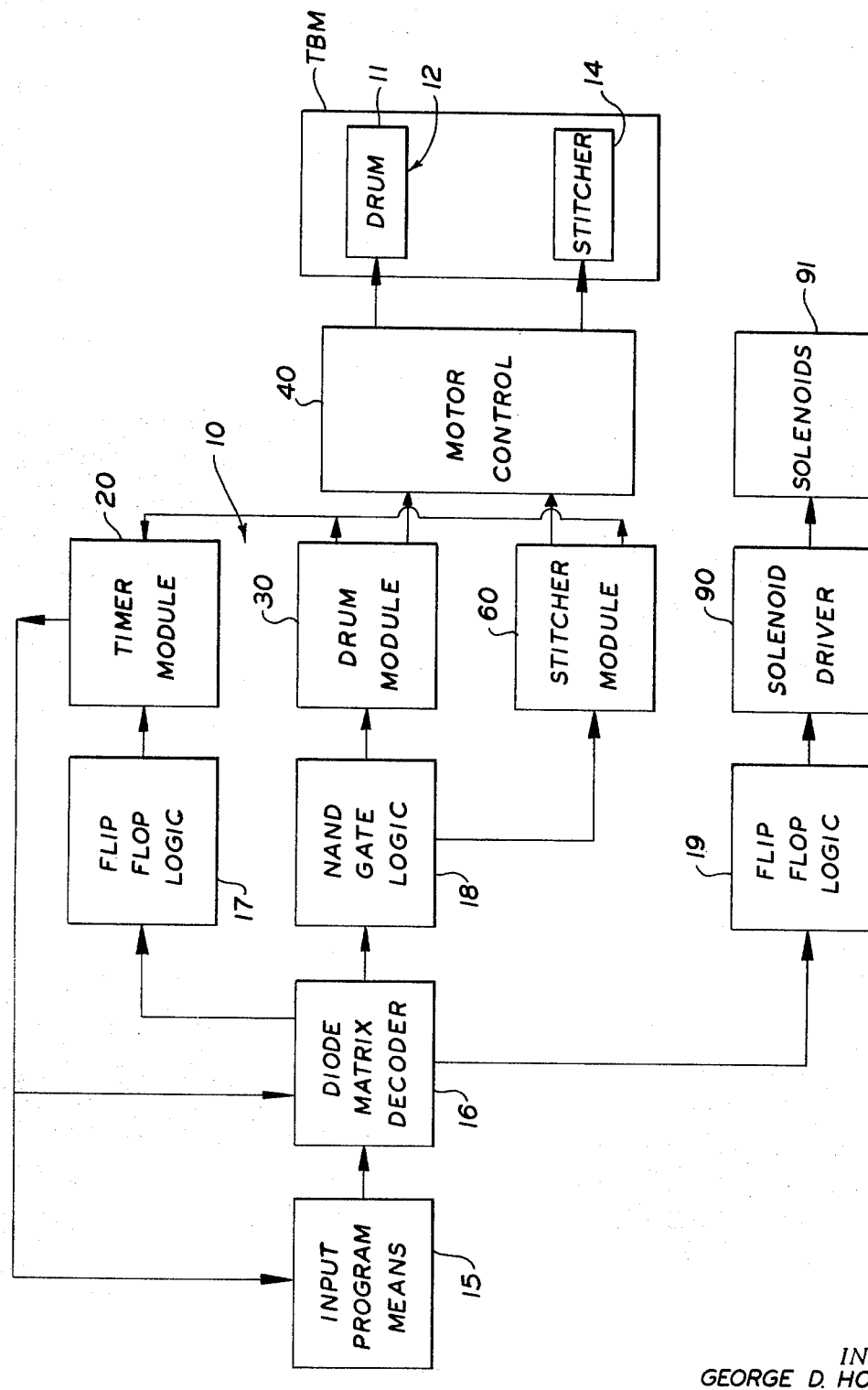
FIG. 1 is a block diagram of the control system according to the concepts of the present invention.

A control system according to the invention, referred to generally by the numeral 10, is used with a tire building machine (TBM) having drum 11 with a generally cylindrical working surface 12. Reference is made to U.S. Pat. No. 2,567,064 for such further details as may be necessary to understand the techniques of building a tire on a rotating drum 11.

System 10 is provided with an input program means 15 which can take any of a number of conventional forms. For example, paper or metallic tape can be utilized wherein decimal numbers are punched in binary coded form usually in an eight channel configuration. A conventional photoelectric tape reading device can convert the coded program into electronic signals which may then be fed to a diode matrix decoder 16, a "high" signal, on the order of 16 volts, being provided if a hole is present in a channel and a "low" signal, on the order of one-half volt, being provided if no hole is encountered in the particular channel.

The decoder 16 consists of a number of positive AND gates which as is well known in the art, will generate a pulse only during the simultaneous occurrence of two or more other pulses. Through these AND gates, the matrix decoder 16 converts the signals from the input program means 15 into a single conventional decimal number. This number corresponds to a specific machine function, in this case a step in the tire building sequence. For example, if the decoder 16 reads the numeral "21" from the input program means 15, this can be made to correspond to a bead setting step. When the signal from the input program means 15 is decoded and one conventional decimal number obtained, a wire corresponding to that number is supplied with a "high" voltage. Through these independent wires, the matrix 16 activates circuitry to achieve the desired function in a manner to be hereafter described.

Certain of the coded function signals from the matrix decoder 16 are fed to one of a plurality of flip-flop circuits 17 which in turn, activate the timer module 20. As will be hereinafter explained, the flip-flop circuits 17 when once activated or "set" by the matrix decoder 16 are "reset" at the end of a timing period by the timer module 20. The signals fed directly to the timer module through the flip-flops 17 from decoder 16 are those signals which correspond to steps in the tire building sequence which must be timed independently, that is, those steps do not themselves provide a "completion signal" of their own. As will hereinafter be described, the completion signal is an end of operation signal having many sources for the purpose of advancing the input program means 15 to the next command.

Figure 2:
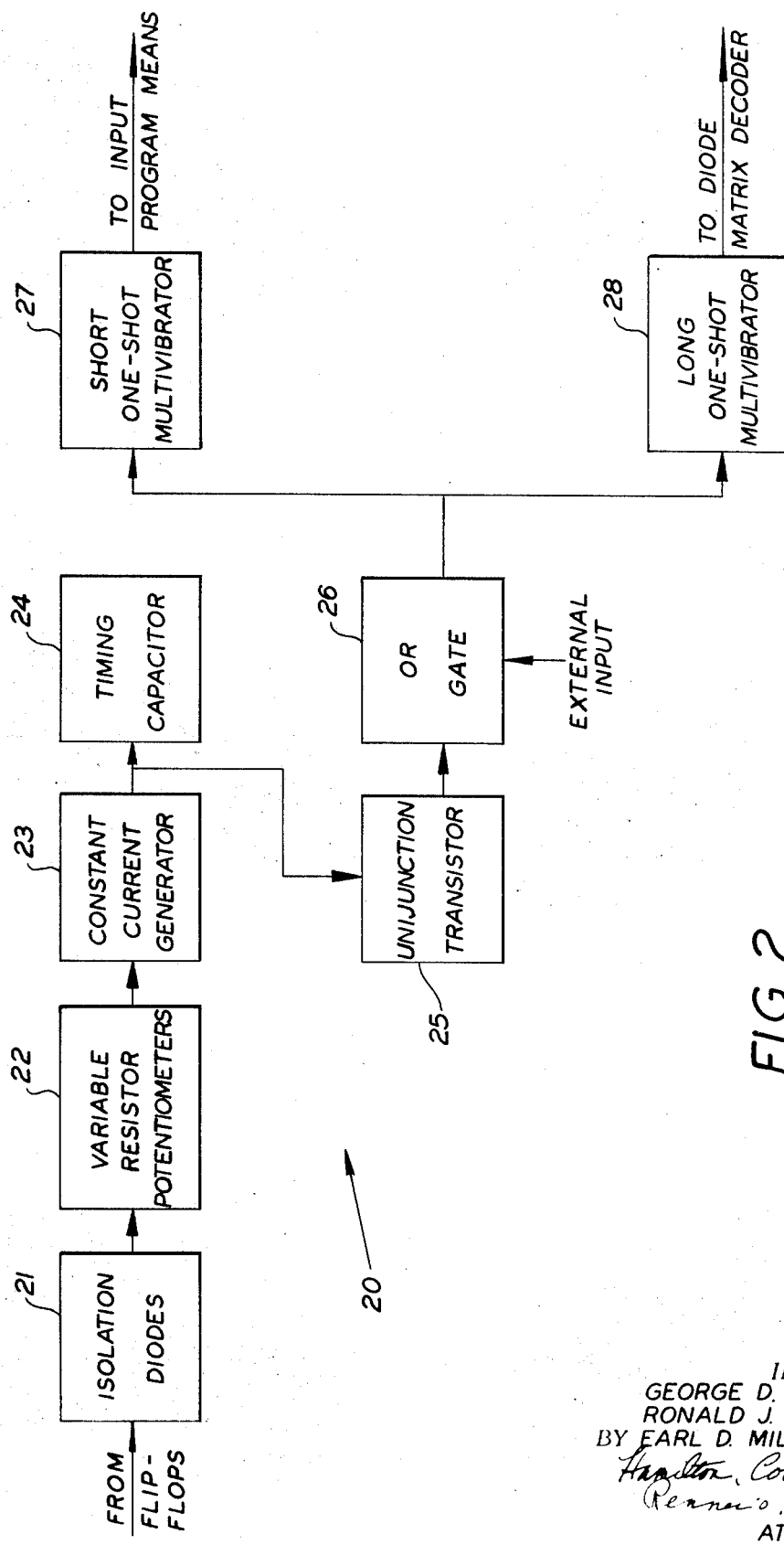
FIG. 2 is a block diagram of the timer module shown in FIG. 1.

The timer module 20, best seen in more detail in FIG. 2, consists of a series of electrical components which establishes machine function timing periods and also provides enable/disable signals to the diode matrix 16. The latter function allows the matrix 16 to read the code of the input program means 15 only when the input or tape is motionless. Thus the timer module 20 disables the matrix 16 during periods of tape transfer.

Timer module 20 receives one of a plurality of inputs from the output of the flip-flop circuits 17, one of the inputs being "high" and the other being "low," since the diode matrix 16 is capable of putting out on an individual line only one "high" signal at a time. To prevent interaction between the outputs of circuits 17, each timer module 20 input is isolated from the other by diodes 21 in a standard manner. The thus isolated "high" input is provided to one of a plurality of variable resistor potentiometers 22 which then activates a constant current generator 23. The activation of constant current generator 23 begins charging the timing capacitor 24, the charge of which increases linearly with time at a rate determined by the setting of the particular variable resistor potentiometer 22.

When the timing capacitor 24 reaches a certain voltage level, for example, 5 volts, a unijunction transistor 25 is caused to fire producing an output pulse. The leading edge of this pulse is used, through a standard OR gate 26, to trigger two one-shot multivibrators 27 and 28. Multivibrator 27 provides a pulse of short duration on the order of 1.5 millisecond and is fed back to the input program means 15 to control the advance of the program. When the program is magnetic tape, for example, the short one-shot multivibrator 27 causes the tape drive mechanism to advance one tape line. Multivibrator 28 provides a much longer pulse, on the order of 20 milliseconds, which is considered the disable signal in that it prevents functioning of the diode matrix decoder 16 when the tape or other program is moving.

As is well known in the art, the OR gate 26 is a diode device which will conduct when a voltage is present at one of a plurality of inputs. Thus, as just described, when a pulse appears from unijunction transistor 25, an output will appear from OR gate 26. Likewise, the OR gate 26 will be satisfied if a pulse appears from an external input shown in FIG. 2. This external input is in the form of an operation completion signal from other portions system 10, the details of which being hereinafter described.

When not disabled by the timer module 20 as just described, other "high" and "low" signals from the diode matrix decoder 16 can be fed to a NAND gate logic system 18. These signals, differentiated from those that go to flip-flops 17, are those corresponding to steps in the tire building sequence for which no timing interval is needed, a completion signal being provided at the end of the specific step. Of course, only one "high" signal on a specific wire can be provided at one time. This "high" signal is combined with other inputs (not shown) to an AND gate which provides a "high" output if the signal from decoder 16 and all other inputs is "high"; otherwise, the circuit would be "disabled" in a low output state. These "other inputs" are in this instance inputs provided as "highs" only when certain physical conditions are met.

For example, in a bead setting step, a certain wire would have a "high" signal thereon and be provided to the NAND gate 18. However, no output would appear from the NAND gate unless other inputs thereto would be "high." These other inputs would, in this instance, correspond to certain physical conditions, to wit: the drum must be locked from rotation; the stitcher must be in a retracted position; the drum must be expanded; etc.

Figure 3:
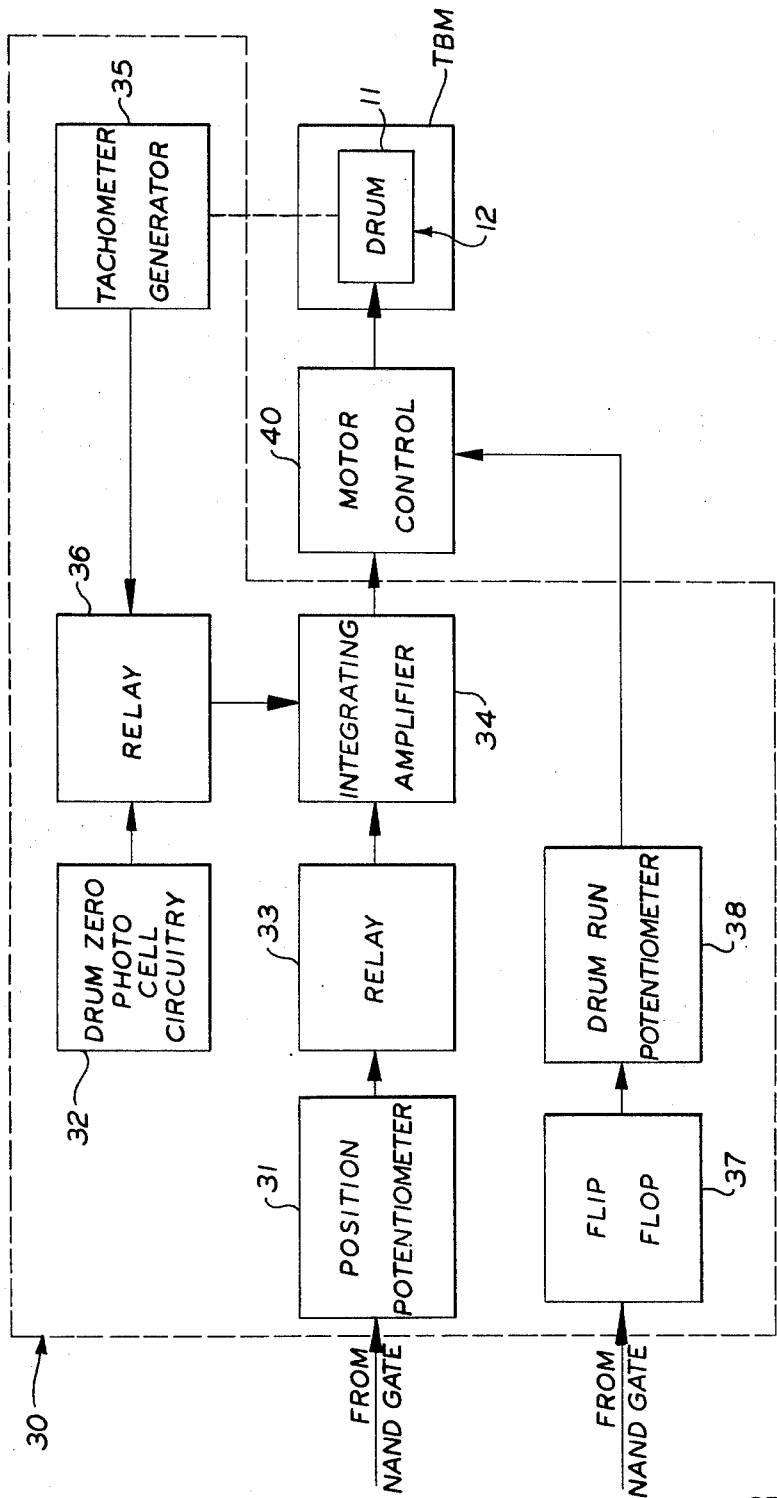
FIG. 3 is a block diagram of the drum module and control circuitry shown in FIG. 1.

Drum module 30, called such because of its environmental association with a tire building drum, is shown in more detail in FIG. 3, being enclosed in the dotted lines. The primary functions of drum module 30 are providing for rotation of the tire building drum from any starting point through a preset number of degrees, positioning the drum to a specific controllable point from a known starting point, and merely providing for drum revolution at a preset speed during stitching and work operations.

The positioning function is utilized to provide a plurality of starting points around the drum for ply application. This prevents the bulky build-up of ply splices which would occur if each ply of fabric began at the same point on the drum. A plurality of controllable positions can be provided for, each being established by the setting of a potentiometer 31. Each potentiometer setting is referenced to what can be called a drum zero position. This position is a starting point which is sensed by a photocell circuitry 32. Dependent on the setting of a particular potentiometer 31, the drum will rotate the desired number of degrees from the drum zero position upon command.

When the input program means 15 orders a ply application function, the appropriate signal is transferred to the drum module 30 as previously described. A relay 33 then closes the circuit causing the voltage on the specific potentiometer 31 to be imposed on an integrating amplifier circuitry 34, which, of course, includes a charging capacitor. Amplifier circuitry 34 can be designed so that the voltage across the charging capacitor builds up almost instantaneously. This voltage actuates the motor control 40 to drive the drum 11. Motor control 40 is a solid state bidirectional and regenerative system which operates the drum and stitcher motors on command.

A tachometer generator 35 is coupled to the drum 11 and feeds back to circuitry 34 a voltage corresponding to drum speed. This voltage is, however, fed back only after the drum zero photocell signal means 32 has closed a relay 36. The tachometer generator 35 is used to discharge the previously charged capacitor as the drum rotates. The voltage across the aforementioned capacitor therefore represent "distance to go" with the time integral of the tachometer signal representing distance travelled. These two signals are algebraically added by the circuitry 34 and when zero volts appear, the drum stops rotating, it now being at the desired position (with reference to drum zero) originally set in potentiometer 31.

When a rotation function is commanded by the input program means 15 not referenced to drum zero, similar circuitry is activated. In this instance, the particular potentiometer 31 is again set to provide for the desired angular revolution and relay 36 is immediately energized instead of waiting for the drum to pass the drum zero position. Thus, the rotation function is accomplished from any starting point.

Whether providing one drum revolution or positioning the drum to a controllable point, upon the completion of the function a signal is provided through standard comparator circuitry (not shown) to activate the timer module 20 in a manner previously described.

The function of drum running at a constant speed is controlled directly from the NAND gates 18 through flip-flop memory logic 37. When a flip-flop 37 is set, a drum-run potentiometer voltage 38 is imposed on the motor control circuitry to run the drum accordingly.

Certain of the lines from the NAND gate 18 are provided to the stitcher module 60, the stitcher 14 being one of the "work devices" referred to above. These lines, of course, carry signals which correspond to those steps in the tire building sequence which relate to stitching functions. Such functions can be broken down into two categories: positioning or prepositioning of the stitcher 14 and actual stitching.

When it becomes desirable to position the stitcher 14 at a particular location, for example, in preparation for a white sidewall stitching operation, the appropriate signal from the input program means 15 would be transferred through the NAND gate logic 18 to the stitcher module 60 enclosed in dotted lines in FIG. 4. Such a signal closes one of a plurality of position relays 61 which latches in and imposes a signal from a position potentiometer 62 onto a conventional differential or error amplifier 63. This voltage into amplifier 63 represents the analog of desired stitcher position. This, of course, can be preset according to certain parameters, such as the size or design of the tire being bult.

The voltage out of amplifier 63 is increased and inverted by another amplifier 64 which then, through the motor control 40, previously described, operates the stitcher 14. A feedback potentiometer 65 monitors the position of the stitcher 14 and presents a feedback voltage to error amplifier 63. As in any standard closed loop position servo system, the input to amplifier 63 (the desired stitcher location) is compared with the feedback signal (actual stitcher location) and any error existing operates the stitcher movement until such time that no error exists, the stitcher being in the proper position. When such position is reached, an absolute value comparator 66 disconnects the latch-in of relay 61 and provides an operation complete signal to the timer module 20.

When an actual stitching function is called for by the input program means 15, the closing of the appropriate relay 67 imposes the voltage preset on stitch potentiometers 68. A relay 69 is also energized causing the signal from the drum tachometer generator 35 to be sensed by amplifier 64. At this same time amplifier 64 becomes disconnected from error amplifier 63 by the opening of a contact therebetween (not shown). Thus, amplifier 64, which acts as an operational amplifier, is connected only to the drum tachometer generator circuit.

The linear speed of the stitcher 14 is thus directly controlled by the speed of the drum. Therefore, if the drum speeds up, as by an adjustment of the drum-run potentiometer 38, the stitcher 14 also moves faster maintaining the same lap ratio. The end result is that all portions of the area being stitched are stitched uniformly. The actual lap ratio can be adjusted and controlled by potentiometer circuitry 70 so that the stitcher speed can be varied for any particular drum speed. For example, settings can be accomplished wherein the stitcher 14 moves a linear distance along the axis of the drum an equivalent of one-fourth its width for every drum revolution.

It may also often be desirable to regulate or change the radially inward pressure of the stitcher 14 as it performs various stitching operations. Normally the stitcher is operating at what can be called a "high" pressure. If, however, at a certain point in the stitching operation it is desirable to change to a "low" pressure, a position potentiometer 80 may be set to perform that function. The voltage on potentiometer 80 is made to correspond to the position at which the pressure is to change. This voltage is provided to a pressure error amplifier 81 which like error amplifier 63 compares the desired input with the actual position signal as provided by feedback potentiometer 65. When the desired position is reached, a pressure switch 82 is actuated changing the pressure accordingly. This switch is reset at the end of the particular stitching function.

Those steps in the tire building sequence which have no direct relation to drum rotation or stitcher position, for example, bead setting or bladder inflating, are, when commanded by the input program means 15, sent by decoder 16 to flip-flop logic circuitry 19. Like flip-flop 17, circuitry 19 serves as a memory gate to activate the solenoid driver circuit 90.

The input stage of the solenoid driver 90 is a basic inverter while the output stage is a power transistor switch which energizes the proper solenoid coil 91 by completing the circuit. Operation complete signals can again be provided to the timer module 20 to signal the tape advance mechanisms for continued automatic operation.

It should now be evident that when the subject control concept is utilized with a tire building machine, more efficient and precise tire manufacturing can be accomplished.

We claim:

1. A control system (10) for a tire building machine including a cylindrical drum (11) and work devices wherein a first ply of fabric is wrapped around the rotating drum and thereafter the work devices associated with the drum sequentially perform operations upon the first ply and other tire components comprising, input program means (15) providing coded commands relating to a specific step in the tire building sequence, matrix decoder means (16) receiving and recognizing said coded commands and providing outputs to activate circuitry to accomplish an operation in the tire building sequence, timer means (20) controlling an output of said matrix decoder means so that said output is provided only at select times, drum control means (30) capable of receiving an output of said matrix decoder means and operating the tire building drum accordingly, said drum control means including integrating amplifier means (34) having a charging capacitor, position potentiometer means (31) charging said capacitor with a charge representing the desired amount of rotation of the drum, tachometer generator means (35) providing a signal which is the analog of drum rotation, said signal from said tachometer generator means discharging said capacitor, and motor control means (40) rotating the drum as long as a charge appears in said capacitor, whereby said drum is rotated according to the setting of said position potentiometer means, and work device control means capable of receiving an output of said matrix decoder means and operating a work device accordingly.

2. A control system according to claim 1 including means (32) for determining a reference point on the drum so that said tachometer generator will not begin to discharge said capacitor until said reference point is reached.

3. A control system for a tire building machine including a cylindrical drum and work devices wherein a first ply of fabric is wrapped around the rotating drum and thereafter the work devices associated with the drum sequentially perform operations upon the first ply and other tire components comprising, input program means providing coded commands relating to a specific step in the tire building sequence, matrix decoder means receiving and recognizing said coded commands and providing outputs to activate circuitry to accomplish an operation in the tire building sequence, timer means controlling an output of said matrix decoder means so that said output is provided only at select times, drum control means capable of receiving an output of said matrix decoder means and operating the tire building drum accordingly, and stitcher control means capable of receiving an output of said matrix decoder means and operating a stitcher accordingly, said stitcher control means including a position potentiometer means (62) providing a signal to a position servo means positioning the stitcher with respect to the drum, said position servo means including error amplifier means receiving the signal from said position potentiometer means (62) and feedback potentiometer means monitoring the position of the stitcher and providing a feedback signal to said error amplifier means, and motor control means (40) receiving the output of said error amplifier and positioning the stitcher accordingly, the output of said error amplifier equaling zero when the stitcher is properly located according to the signal from said position potentiometer means.

4. A control system for a tire building machine including a cylindrical drum and work devices wherein a first ply of fabric is wrapped around the rotating drum and thereafter the work devices associated with the drum sequentially perform operations upon the first ply and other tire components comprising, input program means providing coded commands relating to a specific step in the tire building sequence, matrix decoder means receiving and recognizing said coded commands and providing outputs to activate circuitry to accomplish an operation in the tire building sequence, timer means controlling an output of said matrix decoder means so that said output is provided only at select times, drum control means capable of receiving an output of said matrix decoder means and operating the tire building drum accordingly, and stitcher control means capable of receiving an output of said matrix decoder means and operating a stitcher accordingly, said stitcher control means including operational amplifier means, tachometer generator means providing a signal which is the analog of drum speed to said amplifier means, and motor control means moving the stitcher according to the output of said amplifier means.

5. A control system according to claim 4 wherein lap ratio potentiometer means adjusts the movement of the stitcher with respect to the speed of the drum.

6. A control system for a tire building machine including a cylindrical drum and work devices wherein a first ply of fabric is wrapped around the rotating drum and thereafter the work devices associated with the drum sequentially perform operations upon the first ply and other tire components comprising, input program means providing coded commands relating to a specific step in the tire building sequence, matrix decoder means receiving and recognizing said coded commands and providing outputs to activate circuitry to accomplish an operation in the tire building sequence, timer means controlling an output of said matrix decoder means so that said output is provided only at select times, drum control means capable of receiving an output of said matrix decoder means and operating the tire building drum accordingly, and stitcher control means capable of receiving an output of said matrix decoder means and operating a stitcher accordingly, said stitcher control means including pressure error amplifier means receiving an input signal from pressure position potentiometer means, the setting of said pressure position potentiometer means representing the position of the stitcher at which it is desired to change the pressure applied to the drum by the stitcher, feedback means monitoring the position of the stitcher and providing a feedback signal to said pressure error amplifier, and pressure switch means receiving the signal from said pressure error amplifier and changing the pressure of the stitcher when the desired position of the stitcher is reached.

* * * * *